Aug. 16, 1927.
W. T. HENSLEY
PULLEY
Filed Feb. 25, 1924
1,639,503
4 Sheets-Sheet 2
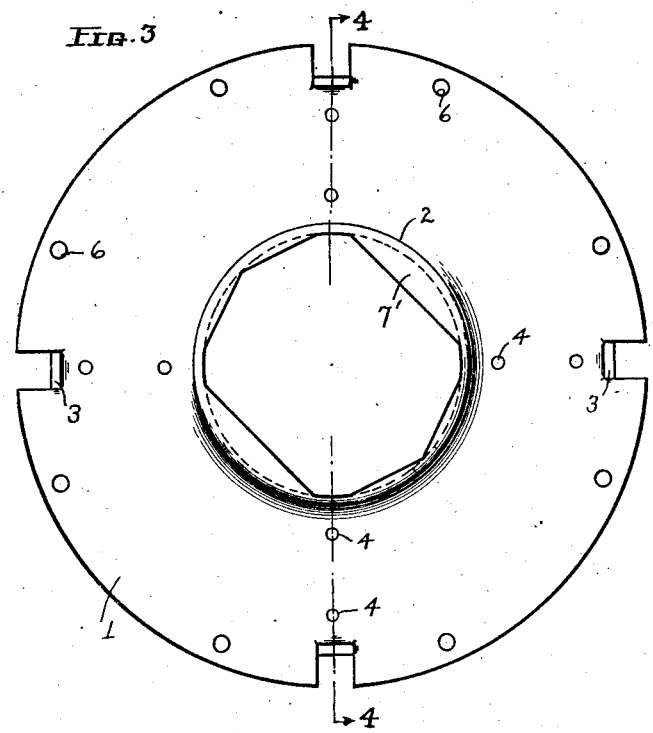
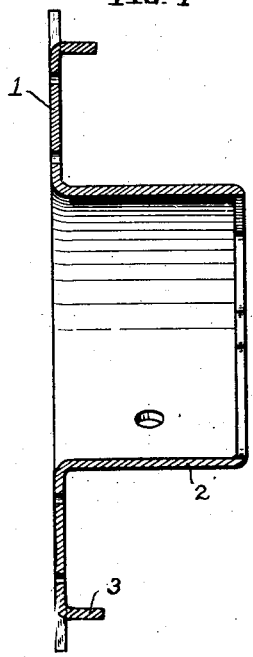
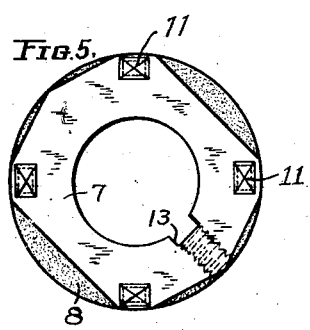
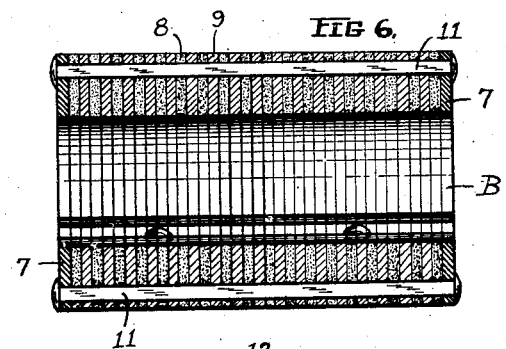
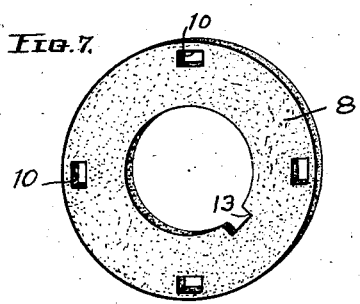
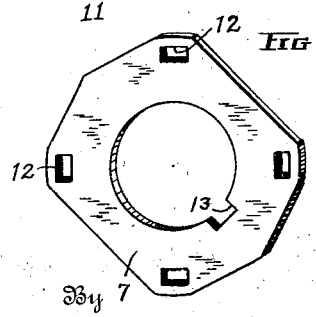
Inventor
Wm. T. Hensley
By Lloyd L. Evans
Attorney

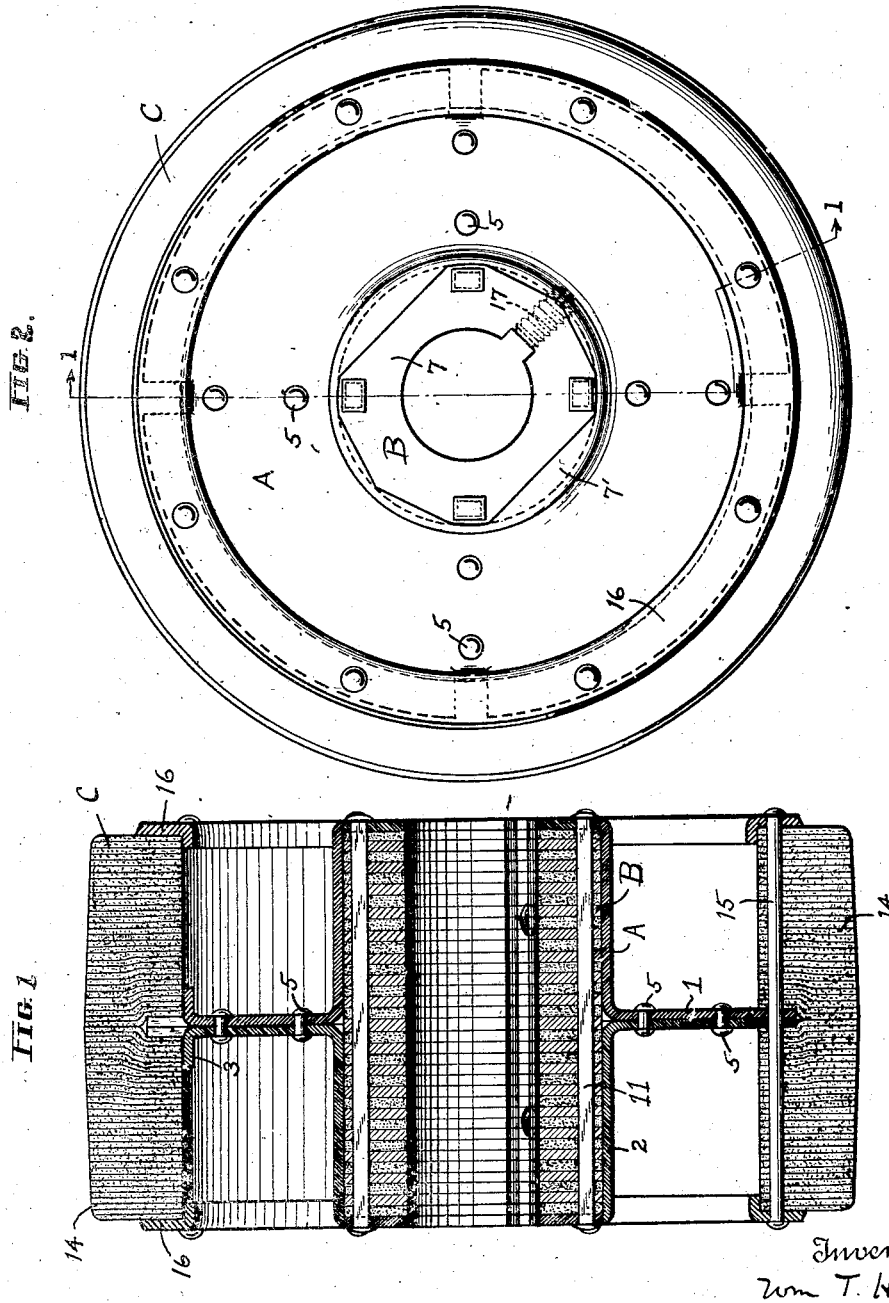

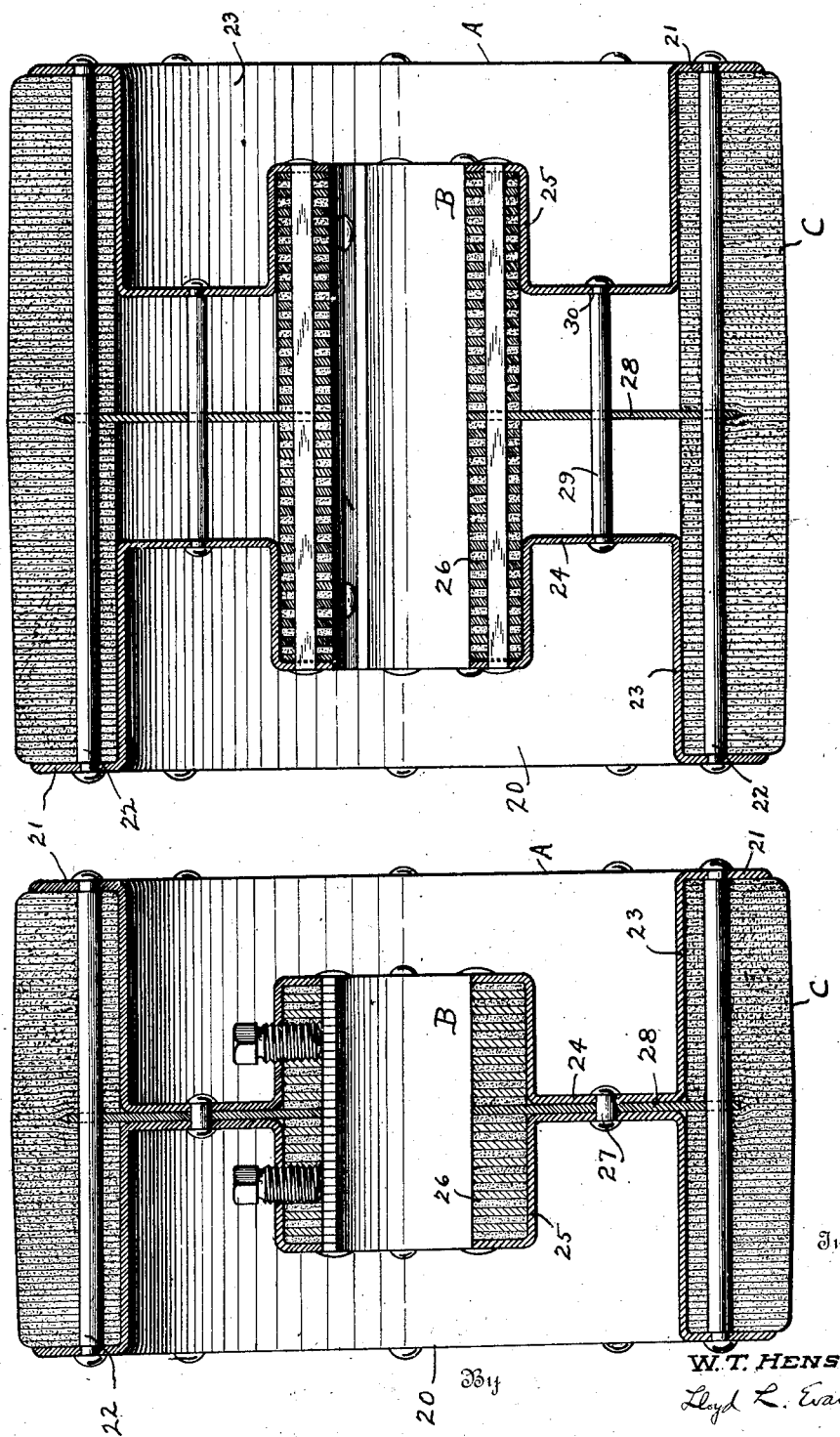

Aug. 16, 1927.

W. T. HENSLEY 1,639,503

PULLEY

Filed Feb. 25, 1924     4 Sheets-Sheet 4

Inventor
W. T. HENSLEY.

Lloyd L. Evans
Attorney

Patented Aug. 16, 1927.

1,639,503

UNITED STATES PATENT OFFICE.

WILLIAM T. HENSLEY, OF INDIANAPOLIS, INDIANA.

PULLEY.

Application filed February 25, 1924. Serial No. 695,002.

This invention relates to relatively large, laminated pulleys, that is pulleys of sufficient diameter so that it is preferable to have rim and hub portions with an intervening web portion.

An object of the present invention is to provide a pulley having a body provided with a relatively dense hub possessing great durability and mechanical strength, and with a laminated rim portion possessing the requisite mechanical strength, but having to a high degree the frictional qualities desirable in frictional power transmission elements.

A further object of the invention is to provide a pulley of the type above described in which the parts can be economically manufactured and in which the parts can be quickly and easily assembled to form the complete pulley.

Another object is to provide a pulley having a body comprising parts adapted to be secured together in a plane normal to the axis of the pulley and to contain a laminated rim and hub portion.

It is also an object of my invention to have the end members so formed that they may clamp laminated hub and core members of different axial dimension between them so that the end members may be standard for pulleys of various widths of face.

With the above and other objects in view, the invention may be said to comprise the structure as illustrated in the accompanying drawings, fully set forth in the following description and specifically described in the appended claims, together with such variations and modifications thereof as will be obvious to those skilled in the art to which the invention appertains.

Reference should be had to the accompanying drawings forming a part of this specification, in which Figure 1 is an axial section through the improved pulley taken on the line 1—1, Fig. 2.

Fig. 2 is a side elevation of the pulley.

Fig. 3 is a side elevation of one of the stampings.

Fig. 4 is an axial section through one of the two identical stampings forming the body of the pulley, the section being taken on line 4—4, Fig. 3.

Fig. 5 is an end elevation of the hub core.

Fig. 6 is an axial section through the core.

Fig. 7 is a perspective view of one of the plates used in the core.

Fig. 8 is a perspective view of one of the two polygonal end plates of the core which are cut from the sheet metal stampings forming the body of the pulley.

Fig. 9 is a sectional view taken on line 9—9, Fig. 11 and shows a modified form of pulley embodying my invention.

Fig. 10 is a sectional view of a modified form of pulley having widened rim and hub core parts; the end view of this form of pulley being the same as the end view of the modified form of pulley shown in Fig. 9 and Fig. 11 and the section being taken on a line corresponding in position to line 10—10 of Fig. 11.

Figure 11:
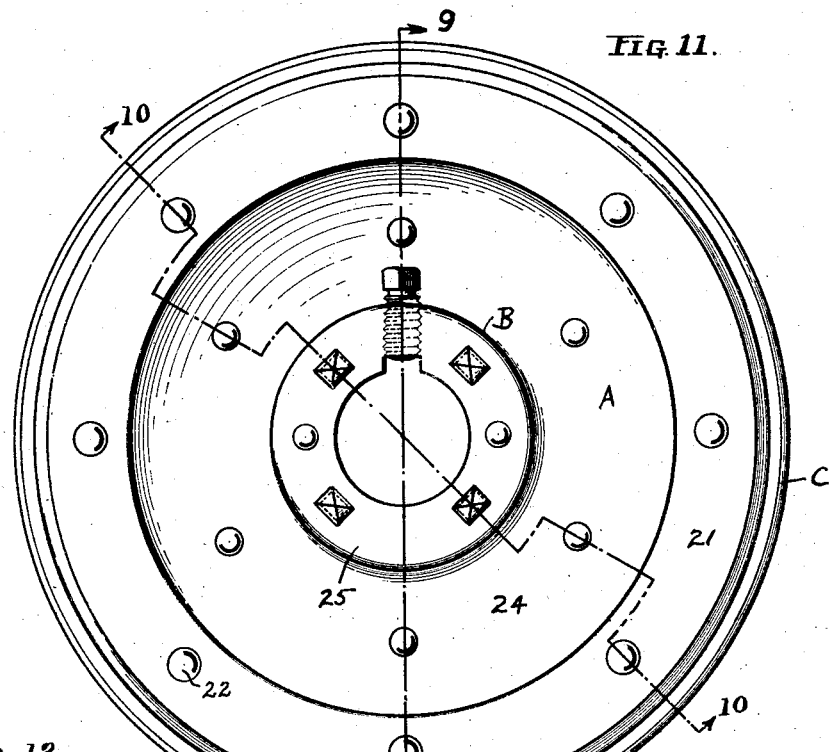
Fig. 11 is an end elevation of the modified form of pulley shown in Fig. 9.

Referring to the accompanying drawing which shows a pulley constructed in accordance with the present invention, the pulley consists of a sheet metal body, indicated generally by the reference character A, which forms the supporting shell within and upon which the laminated hub core and laminated rim are mounted, the laminated hub core being indicated generally by the reference character B and the laminated rim by the reference character C.

As shown in Figs. 1 to 4, the sheet metal body A may consist of two identical stamped disks 1, the central portion of each of which is drawn to the form of a cup 2 within which one-half of the core B is adapted to fit. The flat outer portions of the disks 1 are adapted to be secured together and form the web of the pulley between the hub and rim thereof, the web thus being substantially in the central plane of the pulley and normal to the axis of the pulley. At intervals around the periphery of the disk 1 integral tongues 3 are severed along their side edges from the body of the sheet and bent outwardly at right angles thereto to form supporting ledges for engaging the inner surface of the laminated rim C to center and support the rim.

In radial alinement with the tongues 3 the flat portions of the disks 1 are provided with rivet holes 4 to receive the rivets 5 which secure the disks together. Adjacent the periphery of the disks and between the tongues, rivet holes are provided which receive the rivets which secure the rim C to the body of the pulley, as will be hereinafter described.

From the bottom of the cup 2 of each of the disks 1 there is cut a polygonal plate 7 shown in Figs. 2, 5 and 8, the plates 7 forming the end plates of the laminated core B and being adapted to fit in the openings from which they were cut when the pulley is assembled. By reason of the polygonal shape of the opening formed by removing the plates 7, the segmental edge portions 7' of the bottoms of the cup portions 2 of the disks remain and serve to engage the ends of the core B to hold the same firmly against longitudinal movement with respect to the hub portion of the body and to engage with the end plates 7 thereof to lock the core against circumferential movement with respect to the body. The segments 7' also serve to brace the cylindrical hub portion of the sheet metal body and make it more rigid.

The hub core B may be made up of disks or plates of fibrous material, such as paper, strawboard and the like, or may comprise metal plates, or both fibrous and metal plates alternated in any desired manner. In the formation of the core, the various plates may be assembled, pressed and riveted to hold them in compressed condition. When fibrous plates are used, they are preferably compressed sufficiently to substantially increase their density for engagement with a shaft.

As shown in Fig. 6, the plates 8 and 9 are formed with rectangular openings 10 regularly spaced circumferentially thereof and adapted to be alined when the disks are assembled to receive the rivets 11 which serve to permanently bind the disks together. The end plates 7 are provided with rectangular, angularly spaced openings 12 corresponding to the openings 10 in the plates 8 and 9. The plates 7, 8 and 9 may be provided with notches 13 before the disks are assembled, so that when alined they form the keyway in the core to receive a driving key so that the pulley will rotate with the shaft upon which it is mounted, or the keyway may cut in the core after assembly. After the plates 8 and 9 have been assembled with the end plates 7, the core is compressed to the exact length desired and the rivets 11 are headed over against the outer faces of the plates 7 to hold the core to the desired length.

In the embodiment of the invention disclosed in Figs. 1 to 4, the sheet metal disks 1 are formed in suitable presses and the plates 7 are punched from the bottoms of the central shaped portions thereof. The hub core B is formed ready for insertion in the pulley, each end of the core being provided with the end plates 7 fitting in the openings in the hub portions of the disks and the disks being then secured together by means of the rivets 5, securing the core B permanently in place. The core is preferably provided with threaded apertures in alinement with the keyway 13 to receive suitable set screws 17 for engagement with the key when the pulley is secured to a shaft.

The laminated rim C is secured upon the periphery of the disks 1 which form the body of the pulley and is made up of a series of laminations of fibrous material, which may comprise disks or annular laminæ of any desired length. For instance, each annular piece may be relatively short or may be of a length equal to or greater than one circumferential dimension. Whether short or long, they may overlap or have their ends substantially abut each other, as desired. Or the rim may be made up from a single strip of fibrous material spirally wound into an annular, cylindrical form. As the rim is made up in any of the above ways, the annular laminæ may have a suitable binder, such as casein glue or sodium silicate, applied to the surface, and the assembly may be compressed to the proper density to make a one-piece rim unit. Rivet holes may be provided in the rim unit to receive the rivets 15.

Reinforcing annular rings 16 with the rivet holes 6 therein are provided, and the rivets 15 which pass through the rim and rings may be headed over upon the outer faces of the rings 16. The rivets 15 also pass through the apertures 6 near the periphery of the disks 1 and thus secure the rim C in place upon the web of the pulley. It will be seen that the annular rings 16 are of less radial dimension than the laminæ forming the rim C, so that pressing the rings 16 toward each other will compress the inner portion of the laminæ more than the outer portion, thus leaving the outer portion less dense and relatively soft.

Figure 12:
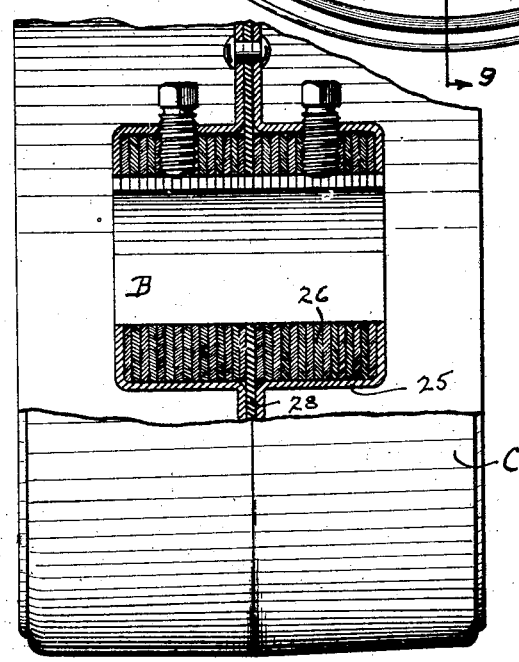
Fig. 12 is a fragmentary view partly in section in which transverse rivets are not used in the hub core.

In the embodiment of my invention shown in Figs. 9 to 12, the metal end members 20 are cup-shaped and provided with outturned flanges 21 to which the rim C is secured by any suitable means, such as rivets 22. The annular walls 23 of the cup-shaped members 20 underlie the rim C throughout their length. The bottoms 24 of the members 20 are provided with inverted cups therein which form the hub 25 to receive the hub core 26.

It will be noted in this form of the invention that the portions 24 of the members 20 may be secured together in any suitable manner as by rivets 27, and as shown in Fig. 9 the plate 28 may be interposed between the members 20 and extend outwardly to engage the rivets 22 of the rim and thus reinforce and strengthen the pulley.

When pulleys are desired with a greater width of face, the members 20 may be spaced as shown in Fig. 10 and riveted together with rivets 29 having shoulders 30 against which the web portions 24 are seated, and the rivets then headed over. It is obvious, of course, that any suitable clamping means to hold the members 20 rigidly and yet hold them spaced apart would suffice. In this form the plate 28 may also be employed and be disposed centrally.

The hub core 26 may be of any suitable construction but is shown as preferably laminated and comprising metal and fibrous laminæ. Also, the set screws 17 are shown for engagement with a key adapted to be received in the keyway 13 to cause the pulley to turn with the shaft to which it is keyed.

Also, in this form of the invention it will be noted that the hub core is directly riveted to the hollow hub portions 25 of the metal members 20 because in this form the hub core, rim and end plates 20 may be assembled and then compressed and riveted in one operation. It is, therefore, unnecessary to form the hub core as a separate unit first, although it is obvious that this may be done if desired and certain apertures left through the core and hub portions through which rivets may be inserted to be headed during or after the pressing operation, so that the core will be rigidly secured to the hub casing 25.

It will thus be seen that I have provided a pulley for power transmission having a laminated hub portion which may be readily secured to a shaft to rotate therewith, and having an outer laminated rim portion for engagement with a belt or other power transmitting device, and that both of these portions are connected by a relatively strong web portion. Thus I have produced a relatively cheap pulley of this type not having the usual cast iron or solid metal hub, and which also has a relatively light but strong rim portion having a maximum frictional surface.

It will also be seen that if the laminated core be made up of part metal and part fibrous material alternately arranged the drilling of the central aperture therein may be accomplished in relatively much quicker time.

While I have shown a laminated rim and prefer such a rim, it is of course obvious that the construction of my pulley lends itself easily to the use of any rim which can be made if desired of various non-laminated materials, such as paper pulp and the like, and may be molded in the shape of a hollow, cylindrical member to form a unit which may be riveted or otherwise secured to the end plates or to the peripheral portion of the web, as the case may be.

Under present conditions I prefer the construction of end members or plates shown in Figs. 9 and 10, in which these members 20 are shown as integral and having the hub receiving portions and the web portions reversely drawn from sheet metal disks. It is to be understood, however, that the hub cups may be separately made and be secured to the web in any suitable manner and the peripheral or rim engaging portion of the member may be made separately and secured to the web if desired.

It will thus be seen that I have provided a relatively simple construction of pulley which may be quickly and easily fabricated and assembled, and which is inexpensive to produce.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A pulley comprising a core of laminated fibrous material, a pressed metal body having a hollow hub portion adapted to receive and house said core and a web portion encircling the hub portion, and a laminated rim secured to the peripheral portion of the web.

2. A pulley comprising a body having a hollow cup-shaped hub portion and a web portion encircling the hollow hub portion, a laminated core mounted within the hollow hub portion of the body, and a laminated rim secured to the peripheral portion of the web, the laminæ of both the core and rim being disposed at an angle to the axis of the pulley.

3. A pulley comprising a sheet metal body formed of a pair of disks having flat outer portions secured together to form a central web and central hub portions formed to provide cylindrical walls projecting from opposite sides of the web, a laminated core fitting within the hollow cylindrical hub portion of the body, and a laminated rim secured upon the peripheral portions of the web.

4. A pulley comprising a body having a hollow hub portion and a web portion encircling the hub portion, a laminated core secured within the hollow hub portion of the body, said core having a longitudinal bore to receive a shaft and having its laminæ disposed at right angles to the axis of the pulley, and a rim secured to the periphery of the web.

5. A pulley comprising a pair of metal members formed with opposing hub receiving portions, opposing web portions connected to said hub portions and adapted to be clamped together in a fixed spaced relation, and alined, peripheral portions connected to said web portions and adapted to receive a rim, a hub core of substantially cylindrical form secured in said hub receiving portions, an annular rim composed of fibrous material having an outer frictional surface secured to said peripheral portions, and a reinforcing disk carried by the hub core and extending into the rim and perforated to receive the securing members which secure the rim to the peripheral portions of the webs together and the hub core to the hubs.

6. A pulley comprising a pair of metal members having opposing hub receiving portions formed therein, opposing web portions and alined, annular, peripheral portions adapted to receive a rim, means to hold said opposing web portions in fixed axial relation, a hub core mounted in said hub portions and carrying a disk, said hub core and disk being secured to said hub portions, and means passing through the rim and securing the rim to said peripheral portions of the metal members, said disk extending from the hub core into the rim and disposed to engage all of said holding and securing means, whereby the pulley is reinforced by said disk.

7. A pulley comprising a sheet metal body formed of a pair of members with flat web portions secured together, said members having oppositely extending hub portions, a laminated core fitting within the hub portions, said hub portions having integral portions at their ends to engage the ends of the core to retain the same, and a rim secured upon the peripheries of the members.

8. A pulley comprising a pair of sheet metal stampings having opposing cup-shaped central portions and opposing flat, web portions encircling the cup-shaped portions, the cup-shaped portions having non-circular openings in the bottoms and a laminated core within the hollow hub portion, said core having end plates adapted to fit in the openings in the disks.

9. The process of making pulleys which comprises assembling a laminated hub core and a laminated rim between metal end plates having portions adapted to receive a core and rim, and pressing said end plates toward each other to materially compress the core and rim simultaneously and permanently securing the end plates in fixed relation.

10. The process of making pulleys which comprises assembling a laminated rim of suitable predetermined length for a given width of pulley face between metal end plates having portions adapted to receive it, pressing said end plates toward each other until the face has the desired predetermined width, and permanently securing said plates together in fixed relation.

11. A pulley comprising a body formed of a pair of sheet metal members with web portions secured together, said members having oppositely extending cylindrical hub portions, a core of compressible material carried by the hub portions, and a rim secured upon the peripheries of the members.

12. A pulley comprising a sheet metal body formed of a pair of members with web portions secured together, said members having oppositely extending hub portions, a laminated core carried within and between said oppositely extending hub portions, and a rim secured upon the peripheries of the members.

13. A power transmitting pulley comprising a pair of opposed sheet metal members each formed with a cup-shaped hub portion, a web portion and a peripheral rim supporting portion, a laminated rim of fibrous material secured to the rim supporting portions of the sheet metal members, and a power transmitting core of compressible material mounted within and secured between the opposed cup-shaped hub portions of the sheet metal members, said rim being of materially greater internal diameter than the external diameter of the core whereby said core directly receives and transmits power to said web portions of the metal members.

In testimony whereof, I hereunto affix my signature.

WILLIAM T. HENSLEY.